United States Patent Office
3,032,187
Patented May 1, 1962

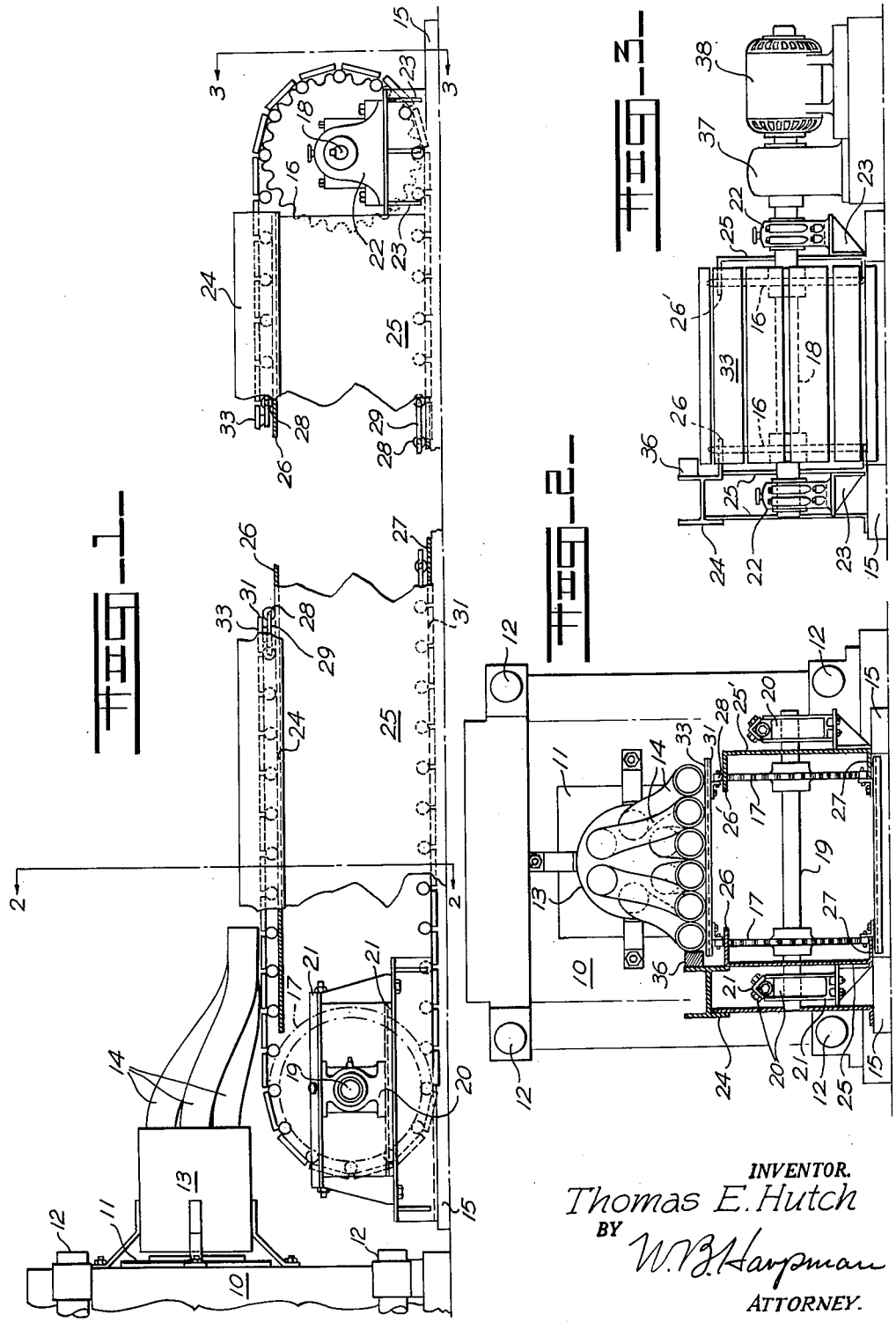

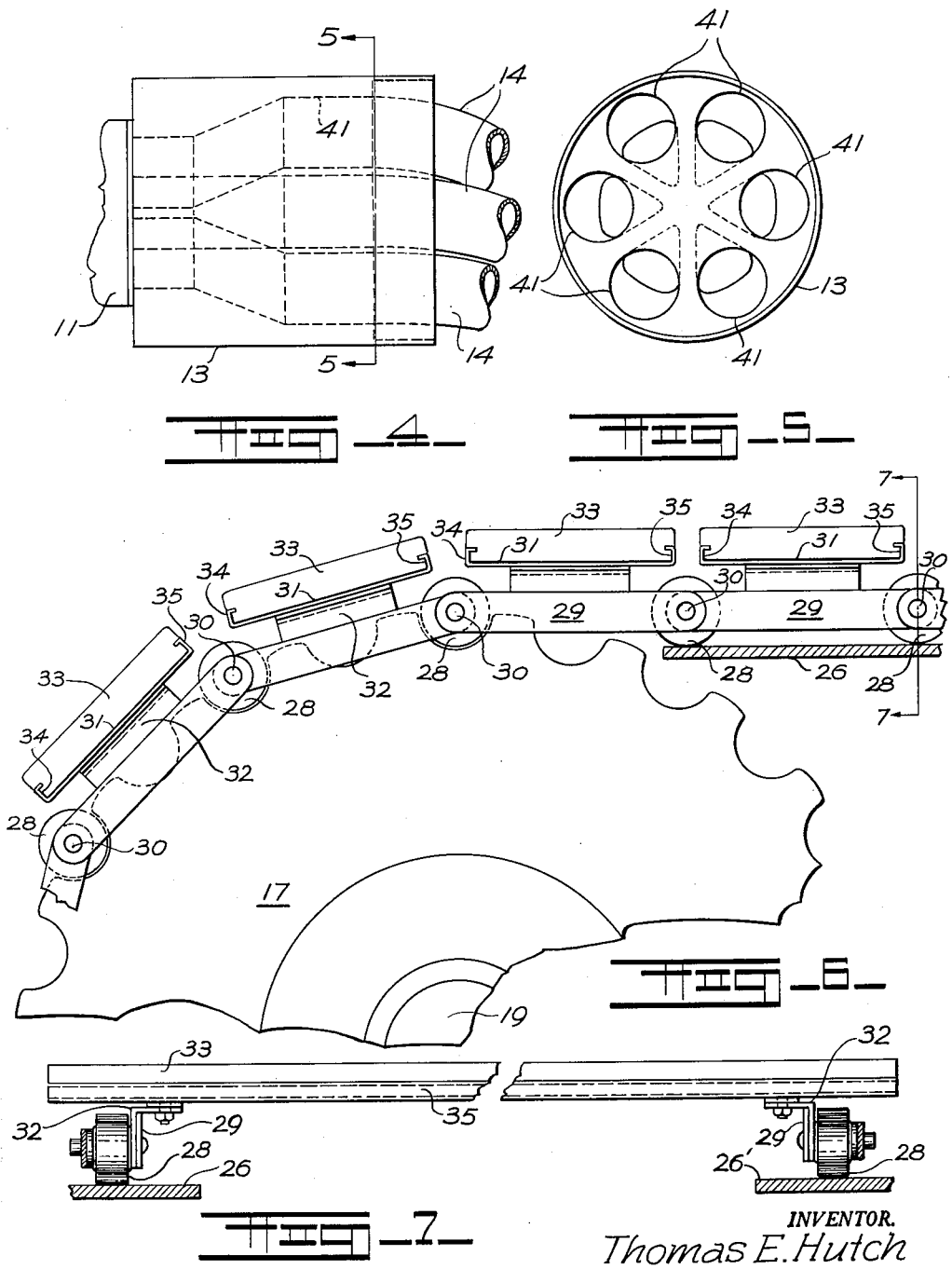

3,032,187
EXTRUSION PRESS RUN-OUT TABLE
Thomas E. Hutch, 4605 Lake Park Blvd.,
Youngstown, Ohio
Filed Mar. 1, 1960, Ser. No. 12,072
2 Claims. (Cl. 207—1)

This invention relates to an extrusion press run-out table and more particularly to a run-out table which will move extrusions away from the press.

The principal object of the invention is the provision of a run-out table incorporating movable table top sections for receiving extrusions and moving them away from an extrusion press.

A further object of the invention is the provision of a run-out table for an extrusion press incorporating a plurality of linked table members movable longitudinally away from the press at a speed greater than the rate of extrusion to receive, support and move extrusions relative to said press.

A still further object of the invention is the provision of a run-out table for an extrusion press including a continuously moving conveyor-like table comprising a plurality of interconnecting extrusion support members together with a guide for receiving a plurality of extrusions and spreading the same transversely and depositing them in individually spaced relation on said moving run-out table.

A still further object of the invention is the provision of a continuously moving run-out table for an extrusion press incorporating extrusion receiving and supporting members connected to one another in an endless link belt arrangement and extending along horizontally disposed spaced support and guide tracks and trained over sprockets positioned at the extreme opposite ends of the run-out table.

The extrusion run-out table disclosed herein is used with an extrusion press of the horizontal type wherein a billet is positioned in a container and engaged by a ram to extrude the metal of the billet through a die usually having multiple die openings therein as will be understood by those skilled in the art. The extrusions delivered by such an extrusion press have heretofore been received on a stationary elongated horizontally disposed run-out table which extends in a straight line axially of the extrusion press. It has been customary in the extrusion art to provide several workmen with tongs by which each workman grips an individual extrusion of the plurality being extruded simultaneously and moves along the run-out table pulling the individual extrusion along the run-out table and away from the press. When a half dozen extrusions are produced simultaneously a half dozen workmen are required and as the rate of extrusion of each individual extrusion frequently varies, considerable difficulty is encountered in maintaining the desired tension on each of the extrusions.

The present invention provides for a run-out table that not only receives the extrusions but moves them individually at their rate of extrusion and thereby eliminates the workmen heretofore believed necessary in this operation. The run-out table provides an additional advantage in that the moving portions of the table impart a considerably less degree of sliding wear and distortion of the individual extrusions than is the case where the extrusions are dragged along a stationary run-out table. As a result, a greater usable length of an extrusion is obtained and less waste is encountered.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a side elevation of a portion of an extrusion press and a run-out table positioned forwardly thereof with parts broken away and parts in cross section.

FIGURE 2 is a vertical section on line 2—2 of FIGURE 1.

FIGURE 3 is an end elevation on line 3—3 of FIGURE 1.

FIGURE 4 is a side view with parts broken away and parts in cross section illustrating a guide member that receives the extrusions from the extrusion die and delivers them to the run-out table.

FIGURE 5 is a vertical view on line 5—5 of FIGURE 4.

FIGURE 6 is an enlarged detail of a portion of the run-out table shown in FIGURES 1 and 2.

FIGURE 7 is a vertical section on line 7—7 of FIGURE 6.

By referring to the drawings and FIGURES 1 and 2 in particular, it will be seen that the drawings show only the forward or delivery end of a horizontal extrusion press such as is used to extrude aluminum and other metal shapes. The billet is charged in the un-illustrated rear or breech end of the press 10. The die and die supporting assembly 11 seals against the forward end of the un-illustrated container in the press in which the billet is positioned. The die and die assembly 11 is mounted in the platen of the extrusion press 10 which is supported on tie rods 12 as will be understood by those skilled in the art and an un-illustrated ram applies pressure to the rear end of the billet and causes the billet metal to extrude forwardly through the die of the die assembly 11 and forwardly away from the press 10.

Positioned in close proximity to the die and die assembly 11 there is an extrusion receiving guide 13 which receives the extrusions from the extrusion die 11 and guides them into a plurality of guide tubes 14 which fan out and terminate on a horizontal plane located transversely of a run-out table. The extrusion receiving guide 13 is supported on the platen of the extrusion press 10 in a movable manner so that it can be moved into and out of extrusion receiving and guiding position as may be necessary in the operation of the extrusion press 10.

The run-out table which receives the extrusions comprises a longitudinally extending structure including a base 15 having a pair of spaced sprockets 16 and 17 at each of its opposite ends, the sprockets being keyed to shafts 18 and 19 respectively. The shaft 19 being journalled in a pair of spaced bearing blocks 20 which are in turn adjustably positioned in a pair of spaced journal guides 21. The journal guides 21 are positioned on the base 15 and include means for securing the bearing blocks 20 in adjusted position relative thereto. The shaft 19 and the pair of sprockets 17 keyed thereon are, therefore, adjustable longitudinally of the run-out table base 15. The shaft 18 to which the sprockets 16 are keyed is supported by a pair of secondary bearing blocks 22 which are positioned on a secondary base 23 which in turn is carried by the base 15. A frame including spaced longitudinally extending upper flanged members 26 and 26', and lower frame members 25 and 25' are positioned longitudinally between the pairs of sprockets 16 and 17. An outturned section 24 of the frame 26 is positioned along one side of the frame. The flanged members 26 and 26' form tracks which are arranged to receive and support a plurality of rollers 28 which are mounted in oppositely disposed pairs on the opposite sides of each of a plurality of links 29 by axles 30 and which axles 30 act as pivots between the ends of the adjacently positioned links 29. Each pair of the links 29 comprises in effect a link in a link belt conveyor. Each pair of links 29 are joined to one another by a link body 31 which is spaced above the pair of links 29 and has portions 32 extending between the links 29 and the link body 31. The link bodies 31 comprise rectangular flanged members each of which is adapted to receive and retain a rectangular section of graphite 33. The rectangular flanged members comprising the bodies 31 have flanges 34 and 35 on their forward and rearward edges respectively, each of which flanges 34 and 35 have inturned upper ends to engage grooves in the graphite sections 33 as may best be seen by referring to FIGURE 6 of the drawings.

By referring now to FIGURES 1, 2 and 7 of the drawings, it will be seen that the rectangular bodies 31 are relatively wider than the distance between the flanges on members 26 and 26' and extend beneath a longitudinal guide 36 carried on the outturned frame section 24 of the frame.

A gear box 37 is connected to the shaft 18 and to a motor 38 so that motion may be applied thereto. It will thus be seen that the pairs of sprockets 16 and 17 are rotated so that the plurality of link bodies 31, which are interconnected by the links 29 and the axle pivot members 30, will move longitudinally of the flanged members 26 and 26'. As illustrated in FIGURE 1 the link bodies 31 move horizontally from left to right on the members 26 tnd 26' away from the press 10, engage the pair of sprockets 16 on the shaft 18, and follow the radius thereof to a point where they engage upon lower flanged frame members 27 and 27' and are supported thereon traveling from right to left, as seen in FIGURE 1, back to the pair of sprockets 17 on the shaft 19 where they follow the radius thereof clockwise and emerge on a horizontal plane again traveling longitudinally away from the press 10 on the members 26 and 26'. It will thus be seen that extrusions delivered from the die and die assembly 11 of the press 10 will be received by the extrusion receiving guide 13 and delivered by the guide tubes 14 thereof to the moving run-out table formed of the plurality of link bodies 31 and the graphite sections 33.

The extrusion reeciving guide 13 is illustrated in enlarged detail in FIGURES 4 and 5 of the drawings, and by referring thereto, it will be seen that the guide 13 comprises a body member having a plurality of circumferentially spaced radially positioned passageways 41 extending therethrough. These passageways 41 are arranged so that the ends thereof, lying adjacent the extrusion die and die assembly 11 are on a smaller annular pattern than the remaining portions thereof and are therefore aligned with the individual die openings in the multiple extrusion die. Extrusions delivered from the die 11 into the passageways 41 are thus initially guided into an enlarged annular pattern. The extrusions then proceed into the tubes 14, one of which connects with each of the passageways 41 and which tubes 14 extend outwardly and downwardly and are curved so that their outermost ends may be positioned on a horizontal plane just above the surface of the graphite sections 33 of the moving run-out table.

In operation, the link bodies 31 move away from the press 10 at a rate faster than the rate of extrusion and which rate of travel may be controlled by the gear box 37 heretofore referred to. The several extrusions being delivered to the run-out table are, therefore, supported and gently urged along the table by the moving graphite sections 33 which are spaced slightly with respect to one another in their normal horizontal travel. The extrusions are, therefore, conveyed from the press and gently urged away from the press regardless of their individual rate of extrusion which, as those skilled in the art will recognize, varies due to slightly different temperatures in the metal being extruded relative to the individual die openings and the condition of the die openings as well as other factors.

The run-out table disclosed herein therefore continuously moves the extrusions along automatically and in a manner so that they are not damaged or distorted, and maintains the extrusions in a relatively straight condition which simplifies the subsequent stretching and straightening operation to which they are subjected.

It will thus be seen that the run-out table disclosed herein meets the several objects of my invention and having thus described my invention, what I claim is:

1. The combination of an extrusion press, an extrusion receiving and guiding device, and a run-out table for supporting and carrying extrusions thereon which latter are discharged from the guiding device, said table being disposed adjacent said press and having a portion thereof extending under said device, said table including an elongated frame with two longitudinally spaced parallel upper track members having a respective lower horizontal surface on each, two pairs of oppositely disposed sprocket members disposed so that a respective pair of the same is adjacent each end of the pair of said track members, two endless link belts rotatably carried by the corresponding sprocket member pairs each of said belts on each track member, each belt consisting of a plurality of rollers and links with each link having a roller pivotally connected to its opposite ends, said rollers being disposed to roll along the respective horizontal surfaces on said track members, the links on each belt being disposed in lateral alignment with each other, transverse support members extending between and connected to the belt links having inturned upper flanges, rectangular graphite members having respective grooves engaging said flanges, said graphite members being disposed in contiguous relationship to each other to provide a large area support surface for carrying extrusions thereon, said guide device having its end overlapping said table with the lower extrusion guiding portions of said device lying in a substantially horizontal plane adjacent and aligned with the upper portion on said graphite members.

2. The combination of claim 1 including mechanical means for imparting rotary movement to said pairs of sprocket members to thereby move said belts and the attached said table to urge said extrusions along their extruding directions.

References Cited in the file of this patent

UNITED STATES PATENTS

| | | |
|---|---|---|
| 1,739,620 | Summey | Dec. 17, 1929 |
| 2,176,365 | Skinner et al. | Oct. 17, 1939 |
| 2,218,809 | Calkins et al. | Oct. 22, 1940 |
| 2,830,700 | Kamena | Apr. 15, 1958 |
| 2,914,170 | Kent | Nov. 24, 1959 |
| 2,950,815 | Oberg | Aug. 30, 1960 |

FOREIGN PATENTS

| | | |
|---|---|---|
| 628,494 | France | June 28, 1927 |
| 875,036 | Germany | Apr. 30, 1953 |
| 1,197,856 | France | June 8, 1959 |